United States Patent [19]

MacMillan et al.

[11] 3,963,566
[45] June 15, 1976

[54] NUCLEAR FUEL COLUMN RETAINER

[75] Inventors: Donald F. MacMillan, Tokyo, Japan; Bart A. Smith, San Jose; Richard P. Dubrule, Escondido, both of Calif.

[73] Assignee: General Electric Company, San Jose, Calif.

[22] Filed: July 24, 1974

[21] Appl. No.: 491,276

Related U.S. Application Data

[63] Continuation of Ser. No. 295,460, Oct. 6, 1972, abandoned.

[52] U.S. Cl. .................. 176/68; 176/74; 176/78; 176/79
[51] Int. Cl.² ........................................... G21C 3/16
[58] Field of Search ............. 176/66–68, 176/74, 76, 78, 79

[56] References Cited
UNITED STATES PATENTS

| | | | |
|---|---|---|---|
| 3,310,474 | 3/1967 | Saunders | 176/79 X |
| 3,344,036 | 9/1967 | Haslam et al. | 176/78 |
| 3,510,398 | 5/1970 | Wood | 176/68 |
| 3,677,894 | 7/1972 | Ferrari | 176/68 |
| 3,713,975 | 1/1973 | Katell | 176/79 |
| 3,772,147 | 11/1973 | Bratton et al. | 176/68 |

*Primary Examiner*—Samuel Feinberg
*Assistant Examiner*—Peter A. Nelson
*Attorney, Agent, or Firm*—Ivor J. James, Jr.; Samuel E. Turner; Sam E. Laub

[57] ABSTRACT

A barrier member fixed in the end of a fuel column retaining spring to prevent contact between the retaining spring and the adjacent end plug of the fuel element whereby contamination of the weld between the cladding tube and end plug with retaining spring material is avoided.

12 Claims, 5 Drawing Figures

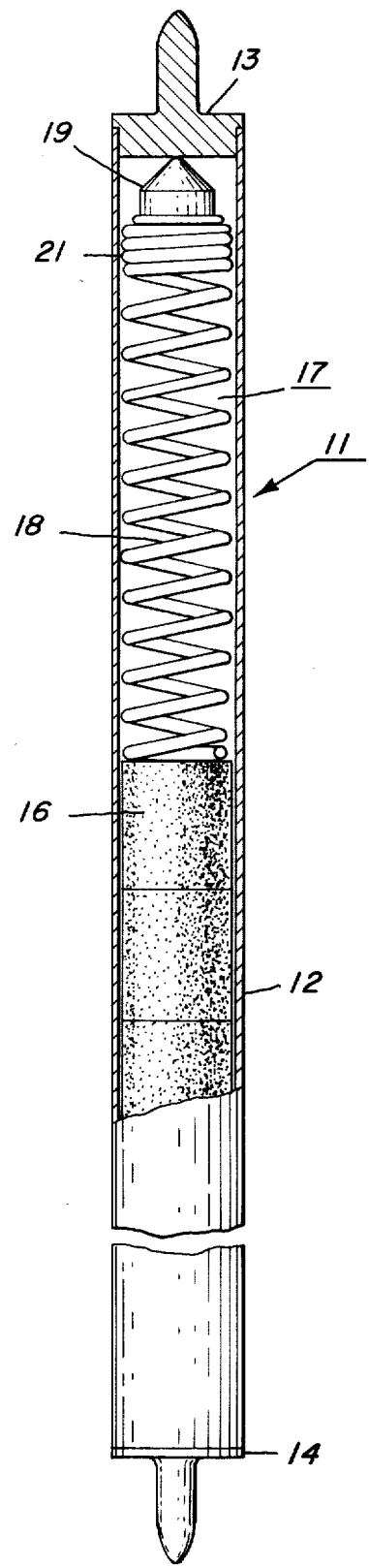
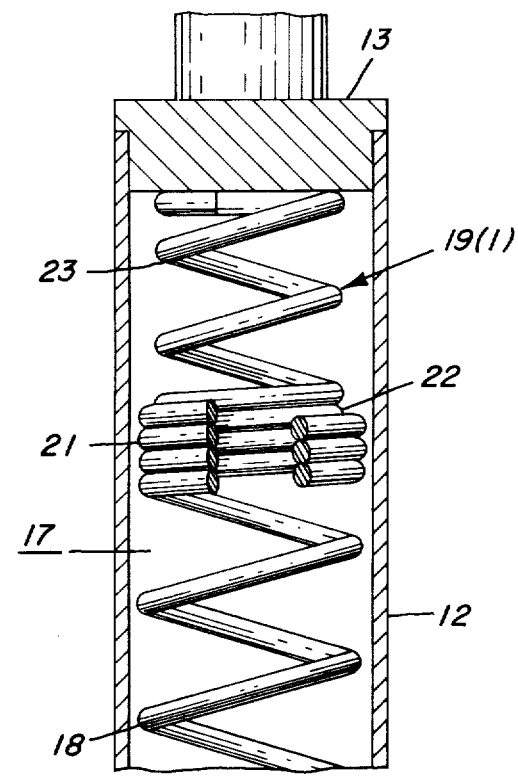
Fig. 2
Fig. 1

NUCLEAR FUEL COLUMN RETAINER

This is a continuation of application Ser. No. 295,460, filed Oct. 6, 1972, now abandoned.

BACKGROUND

In a known type of nuclear power reactor the nuclear fuel is contained in a plurality of elongated fuel elements or rods which are grouped together and contained in open-ended tubular flow channels to form separately removable fuel assemblies or bundles. A sufficient number of fuel assemblies are arranged in a matrix to form the nuclear reactor core capable of self-sustained fission reaction. The core is submersed in a fluid, such as light water, which serves both as a coolant and as a neutron moderator.

Typically the fuel rods are formed of a sealed tube containing the nuclear fuel, for example, in the form of a plurality of cylindrical fuel pellets as shown, for example, in U.S. Pat. No. 3,365,371. The tube, sealed by end plugs, thus serves as a cladding to isolate the nuclear fuel from the moderator-coolant and to prevent release of fission products.

Some of the fission products are gases. To accommodate and contain these fission product gases it is known, as shown in the above mentioned U.S. Pat. No. 3,365,371, to provide a space or plenum in the fuel element which is not occupied by the nuclear fuel. The provision of this space or plenum creates the problem of retaining the column of fuel in its desired position because, for proper nuclear performance, it is important that the fuel be in a specified active fuel zone of the reactor core. If the fuel column is not retained in proper position, it is found that some of the fuel may shift into the above mentioned plenum, especially during handling and shipping when the fuel rod may be in other than a vertical position. It is further found that the shifted fuel may cock or wedge against the cladding tube so that it does not return to its proper position in the active fuel zone when the fuel rod is loaded into the reactor core. Various means are shown in the prior art for retaining the column of fuel in its desired position.

Dished shaped disks or washers to retain the fuel column in position are shown in U.S. Pat. No. 3,230,152, the disks being designed to wedge against the inside of the cladding tube. Such fuel retainers do not provide for axial expansion of the fuel column, they are difficult to insert properly and they can produce undesirably high local circumferential stresses in the cladding tube.

Shown in U.S. Pat. No. 3,627,635 is a resilient cup-shaped member which is placed atop the fuel column and is retained in position by frictional engagement with the cladding.

Another fuel column retainer which depends upon frictional engagement with the cladding tube comprises a helical coil spring with end coils which engage the cladding tube as shown in U.S. Pat. No. 3,310,474.

Another type of fuel column retainer, shown for example in U.S. Pat. No. 3,378,458, comprises a helical coil spring which is somewhat smaller in diameter than the cladding tube and is compressed between the top of the fuel column and the upper end plug of the fuel rod. This type of fuel column retainer has gained favor and is widely used. It provides the advantages of reliable and predictable performance and it avoids circumferential stressing of the cladding tube. A problem attendant the use of such a retaining spring is set forth in said U.S. Pat. No. 3,378,458. Namely, when the end plug is welded into the end of the cladding tube there is a danger that the weld will become contaminated with spring material. This is because the spring material (e.g. Inconel-X, steel or the like) and the end plug and cladding tube material (e.g. zirconium) can form a eutectic alloy, the melting temperature of which is lower than either of the base materials. Formation of this eutectic alloy with the weld or fusion area is unacceptable because of unpredictable corrosion resistance, strength and ductility and other unpredictable material properties of the resulting alloys when subjected to the reactor or fission product environments.

A solution to this problem proposed in said U.S. Pat. No. 3,378,458 includes the bending of an end loop on the retaining spring to an angle of ninety degrees so that this loop contacts only the center (and coolest during welding) portion of the end plug. This loop is also plated or coated with a barrier material (e.g. a material such as chromium) to increase the eutectic temperature. This solution has proven effective when properly implemented and it has been used extensively.

However, in the implementation of the foregoing solution for large scale fuel production, several problems have been encountered including difficulties in achieving high integrity plating, handling damage to the plated spring end and difficulties in detecting imperfections and damage so that quality control to the degree of confidence desired is difficult and expensive to achieve.

SUMMARY

An object of the present invention is to provide a plenum spring arrangement which provides reliable and predictable results and avoids manufacturing problems.

This and other objects are achieved by providing a barrier member between the end of the retaining spring and the end plug of the fuel rod, the barrier member being formed of a material which is compatible with the material of the end plug and/or which has a melting temperature higher than the material of the end plug and which does not form a eutectic of unpredictable properties with the material of the end plug. Preferably the barrier member is suitably secured in the end of the retaining spring so that it is not readily displaced during assembly or handling of the fuel element or bundle.

DRAWING

The invention is described more specifically hereinafter with reference to the accompanying drawing wherein:

FIG. 1 is a longitudinal cross section view of a fuel element or rod incorporating the retaining spring arrangement of the invention;

FIG. 2 is an enlarged longitudinal cross section view of the upper portion of the fuel rod illustrating one embodiment of the invention;

DESCRIPTION

Figure 3:
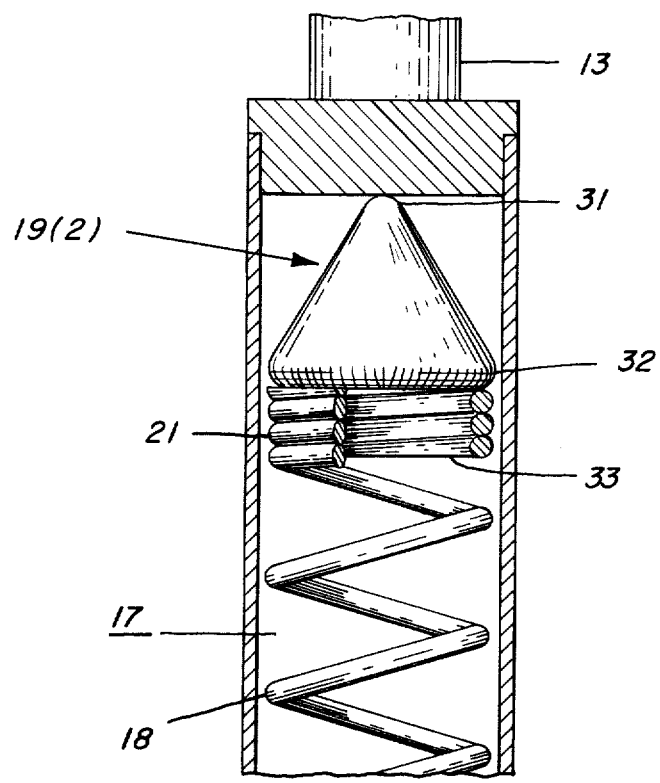
FIGS. 3–5 are enlarged longitudinal cross section views illustrating alternate embodiments of the invention.

Shown in FIG. 1 is a typical fuel rod 11 including an elongated cladding tube 12. The tube 12 is formed of a material suitable for use in a nuclear reactor such as stainless steel, zirconium or the like, zirconium being a preferred material because of its low neutron capture cross section. The ends of the cladding tube 12 are sealed by upper and lower end plugs 13 and 14 which are welded (or otherwise fused) to the tube 12 to prevent entry of coolant-moderator and to prevent escape of fission products.

Contained within the cladding tube 12 is a column of nuclear fuel 16 such as uranium or plutonium dioxide which may be in the form of pellets placed end to end in the tube. The cladding tube 12 is not completely filled with fuel. Instead, a space or plenum 17, free of nuclear fuel, is provided between the fuel 16 and the upper end plug 13 to collect the fission product gases produced during reactor operation and allow for thermal expansion of the fuel column. The volume of the plenum is made large enough to accommodate at reasonable pressure the fission product gases expected to be released by the fuel during its life in the reactor core.

To retain the fuel column 16 in its proper position, especially during handling and shipping, there is provided in the plenum 17 a retaining spring 18 compressed between the top of the fuel column 16 and the upper end plug 13. The retaining spring 18 is formed of a suitable spring material (for example Inconel-X, steel or the like) with an outside diameter somewhat less than the inside diameter of the cladding tube 12 so that the retaining spring exerts no circumferential pressure on the cladding tube.

To prevent contamination of the weld between the end plug 13 and the cladding tube 12 by the material of retaining spring 18, as discussed hereinbefore, there is provided, in accordance with the invention, a barrier member 19 secured to the upper end of spring 18 and extending therefrom to contact the end plug 13 to thereby prevent contact between the retaining spring 18 and the end plug 13. Preferably several turns 21 at the end of spring 18 are close wound to facilitate securing the barrier member 19 thereto. The barrier member 19 is formed of a material which is compatible with the material of the end plug 13 and the cladding tube 12, that is, a material which has either a higher melting temperature than the material of the end plug and cladding tube or which does not form a eutectic therewith and/or a material which if it becomes melted and mixed in the end plug to cladding tube weld does not contaminate or cause a deleterious effect therein. Materials such as Nichrome, zirconium, titanium and tungsten are suitable with zirconium being the preferred material when the end plug and cladding tube are also formed of zirconium.

The barrier member 19 may take several specific forms, embodiments of which are illustrated in FIGS. 2–5. An embodiment of a barrier member 19(1) as shown in FIG. 2 is in the form of a helical coil mated with and thereby secured to the close wound end turns 21 of the retaining spring 18. The helical coil of the member 19(1) may be close wound throughout its length or, as shown, the mating portion 22 thereof may be close wound while the extending portion 23 may be formed with spaced turns. To assure that the member 19(1) is tightly secured in the end of spring 18 the outside diameter of the member 19(1) is preferably slightly greater than the inside diameter of the close wound end turns 21 of spring 18.

An alternate embodiment of a barrier member 19(2) as shown in FIG. 3 is in the form of a shaped plug having a contacting end 31 of limited contact area adjacent the end plug 13, a skirt portion 32 of sufficient diameter to overlap the end of the retaining spring 18 and a shank portion 33 insertable in the end coils 21 of the retaining spring. The shank portion 33 may be formed with a helical groove mating with the end coils 21 so that it may be threaded therein. The shank 33 is advantageously slightly larger in diameter than the inside diameter of the end turns 21 whereby the shank is tightly gripped to retain the member 19(2) fixed to the spring 18 during handling.

Figure 4:
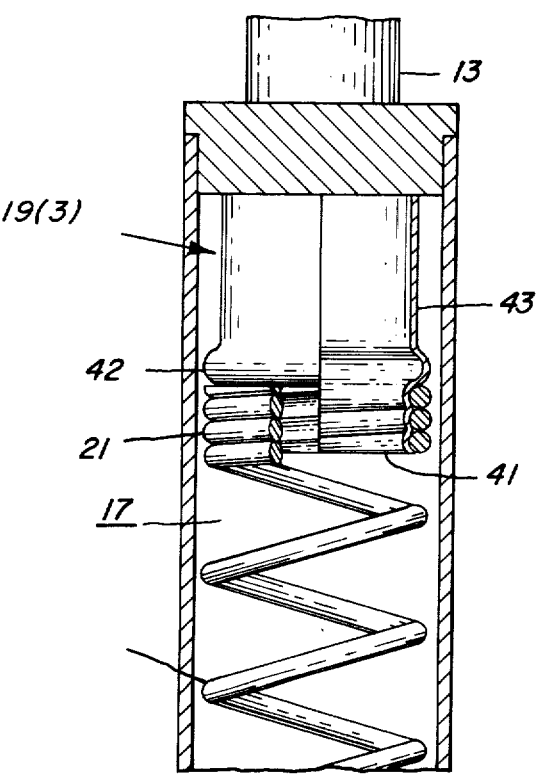

Another embodiment of a barrier member is shown in FIG. 4 as a barrier member 19(3). The member 19(3) comprises a length of thin-walled tubing formed with a lower portion 41 inserted into and of diameter to tightly engage the end turns 21 of retaining spring 18, an outward extending or bulged portion 42 for seating on the spring 18 to thereby limit the depth of insertion and an upper portion 43 contacting the end plug 13. The lower portion 41 may be roll formed with a helical groove to mate with the end turns 21.

Figure 5:
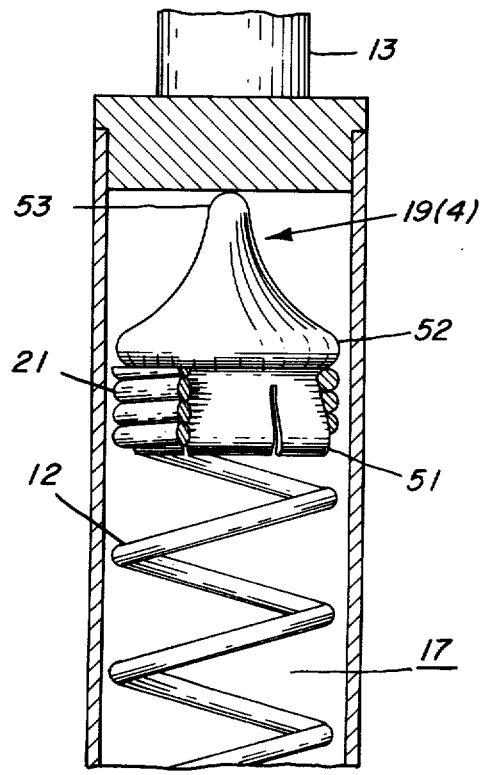

A further embodiment of a barrier member is illustrated in FIG. 5 as an inverted cup-shaped barrier member 19(4). The member 19(4) is formed with a plurality of circumferentially positioned resilient fingers 51 inserted into and engaging the end turns 21 of the retaining spring 18, a shoulder 52 seating on the top of spring 18, and a central protrusion 53 providing a contact of limited area with the end plug 13.

Thus what has been described is a barrier member fixed to the end of a plenum spring of a fuel rod to prevent contact between the plenum spring and the end plug of the fuel rod.

What is claimed is:

1. In a nuclear reactor fuel element comprising a tube, end plugs sealing the ends of said tube and a column of nuclear fuel disposed in a part of said tube thereby forming a plenum free of said nuclear fuel adjacent one of said end plugs, said one of said end plugs having a surface within said tube, the improvement comprising: a retaining spring extending through said plenum with one end adjacent said column of fuel and its other end short of said surface of said one of said end plugs; and a barrier member formed of a helical coil having a plurality of turns mated inside a plurality of turns of said other end of said retaining spring and extending to said surface of said one of said end plugs, said barrier member being formed of a material different from the material of said retaining spring.

2. The fuel element of claim 1 wherein said barrier member is formed of a material similar to the material of said one of said end plugs.

3. The fuel element of claim 1 wherein said barrier member said one of said end plugs and said tube are formed of similar materials.

4. The fuel element of claim 1 wherein the mating turns of said barrier member and said retaining spring are close wound.

5. The fuel element of claim 4 wherein the turns of said helical coil of said barrier member between said other end of said retaining spring and said surface of said end plugs are space wound.

6. The fuel element of claim 1 wherein said helical coil is formed of wire having zirconium as its primary constituent.

7. In a nuclear reactor fuel element comprising a tube, end plugs sealing the ends of said tube and a column of nuclear fuel disposed in a part of said tube thereby forming a plenum free of said nuclear fuel adjacent one of said end plugs, said one of said end plugs having a surface within said tube, the improvement comprising a retaining spring extending through said plenum with one end adjacent said column of fuel and its other end short of said surface of said one of said end plugs; and a and a barrier member formed of thin-walled tubing having a portion at one end thereof extending into said other end of said retaining spring, having a circumferential outwardly extending shoulder seated on said other end of said retaining spring and having a portion at the other end thereof extending to said inner surface of said one of said end plugs, said barrier member being formed of a material different from the material of said plenum spring.

8. The fuel element of claim 7 wherein said barrier member is formed of a material similar to the material of said one of said end plugs.

9. The fuel element of claim 7 wherein said barrier member, said one of said end plugs and said tube are formed of similar materials.

10. The fuel element of claim 7 wherein zirconium is the primary constituent of said similar materials.

11. The fuel element of claim 7 wherein the outside diameter of said one end of said tubing is slightly greater than the inside diameter of the end turns of said other end of said retaining spring.

12. The fuel element of claim 7 wherein said one end of tubing is formed with a helical groove mating with the end turns of said other end of said retaining spring.

* * * * *